United States Patent
Bagchi et al.

(10) Patent No.: US 12,477,351 B2
(45) Date of Patent: Nov. 18, 2025

(54) ORCHESTRATING SIMULATOR APPLICATION IN WIRELESS NETWORK

(71) Applicant: Rakuten Symphony, Inc., Tokyo (JP)

(72) Inventors: Sandeep Bagchi, Bangalore (IN); Nayan Sen, Bangalore (IN); Yuvaraj Krishnaraju, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/021,846

(22) PCT Filed: Feb. 3, 2023

(86) PCT No.: PCT/US2023/061923
§ 371 (c)(1),
(2) Date: Feb. 17, 2023

(87) PCT Pub. No.: WO2024/137000
PCT Pub. Date: Jun. 27, 2024

(65) Prior Publication Data
US 2024/0224062 A1    Jul. 4, 2024

(30) Foreign Application Priority Data
Dec. 23, 2022 (IN) .............. 202241075020

(51) Int. Cl.
*H04W 16/18* (2009.01)
*H04W 24/06* (2009.01)

(52) U.S. Cl.
CPC .......... *H04W 16/18* (2013.01); *H04W 24/06* (2013.01)

(58) Field of Classification Search
CPC .............................. H04W 16/18; H04W 24/06
See application file for complete search history.

(56) References Cited

U.S. PATENT DOCUMENTS

| | | |
|---|---|---|
| 2017/0006055 A1 | 1/2017 | Strom et al. |
| 2021/0173939 A1 | 6/2021 | Kotler et al. |
| 2022/0158926 A1* | 5/2022 | Wennerström .......... H04L 43/20 |
| 2023/0037124 A1* | 2/2023 | Mengwasser ....... H04L 41/5074 |
| 2024/0028357 A1* | 1/2024 | Lan ....................... G06F 9/5077 |

OTHER PUBLICATIONS

Hatledal, Lars Ivar, et al. "A language and platform independent co-simulation framework based on the functional mock-up interface." IEEE Access 7 (2019): 109328-109339. (Year: 2019).*
International Search Report and Written Opinion for International Patent Application No. PCT/US23/61923 mailed May 4, 2023.

* cited by examiner

*Primary Examiner* — Sharad Rampuria
(74) *Attorney, Agent, or Firm* — Sughrue Mion, PLLC

(57) ABSTRACT

Embodiments disclosed herein provides a system for orchestrating simulator application in a wireless network. The system is configured to display a simulator orchestration interface on a user device to orchestrating simulator application. The user interface includes simulator applications. Simulator applications are deployed on the node and a proto-file is retrieved. The proto-file includes service configuration parameters associated with the node using simulator specific communication channel. The deployed simulator application is configured based on the service configuration parameters mentioned in the retrieved proto-file from the node. The configured simulator application is automatically controlled for the service procedures using the specific communication channel.

12 Claims, 14 Drawing Sheets

Setting
E_SIM_DUCP_DOF1RESET#ID:[340fc5d]
Start F1 Reset Configuration
Payload
NRDU
DU service cell count *    Control Plane simulator address interface
1    eth 1
Control Plane simulator address
fd02:0
NRDUFIC configuration    FIC address
FIC interface    fd02:0
eth 1
NRDUFIC configuration
FIC interface    FIC address *    Max DRB *    Protocol type *
eth 1    fd02:0    4    E TCP   v
Max UE per DU    MUCE simulator address *    NRDU list *
700    fd02:0    0
✓ Served cells list present *    +
NRDU name *
nrdu 1
Service cell configuration
User plane simulator address
fd02:0

Close    Save

FIG. 11

ORCHESTRATING SIMULATOR APPLICATION IN WIRELESS NETWORK

CROSS REFERENCE TO RELATED APPLICATIONS

The present application claims priority to and is the 35 U.S.C. § 371 United States National Phase application based on International Patent Application No. PCT/US23/61923, filed Feb. 3, 2023, and entitled "Orchestrating Simulator Application in Wireless Network" which claims priority to Indian Patent Appl. No. 202241075020 entitled "Orchestrating Simulator Application in Wireless Network" filed Dec. 23, 2022, which are hereby incorporated by reference in their entireties.

FIELD OF INVENTION

The embodiments disclosed herein generally relates to data processing and communication with multiple nodes, and more particularly, to a system and a method for deploying simulator application using orchestration.

BACKGROUND OF THE INVENTION

In general, many application releases are usually multi-component, multi-tier deployments requiring complex coordination between application deployment, middleware configuration and database updates. Software deployment refers to a process of making the application work on a target device. The target device can be a test server or a node, a production environment or a user's computer or mobile device. In a physical environment, small changes in system design may be difficult to implement, as many statistically configured input/output and subsystems lack a flexibility to be updated within the system. Existing mechanisms for performing functional test allows a developer to write test scripts. Frameworks require structures that require specificity. An update in the application deployment requires users to change an interface with respect to the updated application. The existing mechanism uses script-based tools for the update in the deployed application to change the interface and that is manual. The manual update in the deployed application is time consuming and a complex process.

In conventional systems of script-based deployment, whenever new features are introduced in the node or in the application, the features of the application are manually updated. The manual updating of the new features or updates is time consuming. Also, as the process is manual, the process is error prone. In the manual updates, if any errors occur, then the user is not able to detect the error until the process of updating the new feature is complete. Therefore, there is no feedback system for letting know the user about the errors in the development stage. Also, deploying the updated features process is difficult in the conventional systems.

Thus, it is desired to address the above mentioned disadvantages or other shortcomings or at least provide a useful alternative.

Object of Disclosure

A principal objective of the disclosure is to provide a method and system for orchestrating simulator application using a wireless network. Service procedures are automatically controlled using a configured simulator application using the simulator specific communication channel. As deployment and configuration of the simulator application is automatically generated, the time taken for the deployment is reduced and the error rate is reduced compared to the script-based updating.

SUMMARY

Embodiments disclosed herein provides a system for orchestrating simulator application in a wireless network. The system is configured to display a simulator orchestration interface on a user device for orchestrating simulator application. The user interface includes simulator applications. Simulator applications are deployed on the node and a proto-file is retrieved. The proto-file includes service configuration parameters associated with the node using simulator specific communication channel. The deployed simulator application is configured based on the service configuration parameters mentioned in the retrieved proto-file from the node. The configured simulator application is automatically controlled for the service procedures using specific communication channel.

In an embodiment, provides a method for orchestrating simulator application in the wireless network. The simulator orchestration interface is displayed on the user device for orchestrating simulator application. The user interface includes plurality of simulator application. The simulator application is deployed from the displayed simulator applications on the node. Further, the proto-file is retrieved from the node including service configuration parameters associated with the node. Furthermore, the deployed simulator application is configured on the node based on the service configuration parameters mentioned in the retrieved proto-file and service procedures are automatically controlled on the node using the simulator application using simulator specific channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIG. 11 is an example illustrating form rendering in the system, according to the embodiments disclosed herein:

DETAILED DESCRIPTION OF DISCLOSURE

Figure 1:
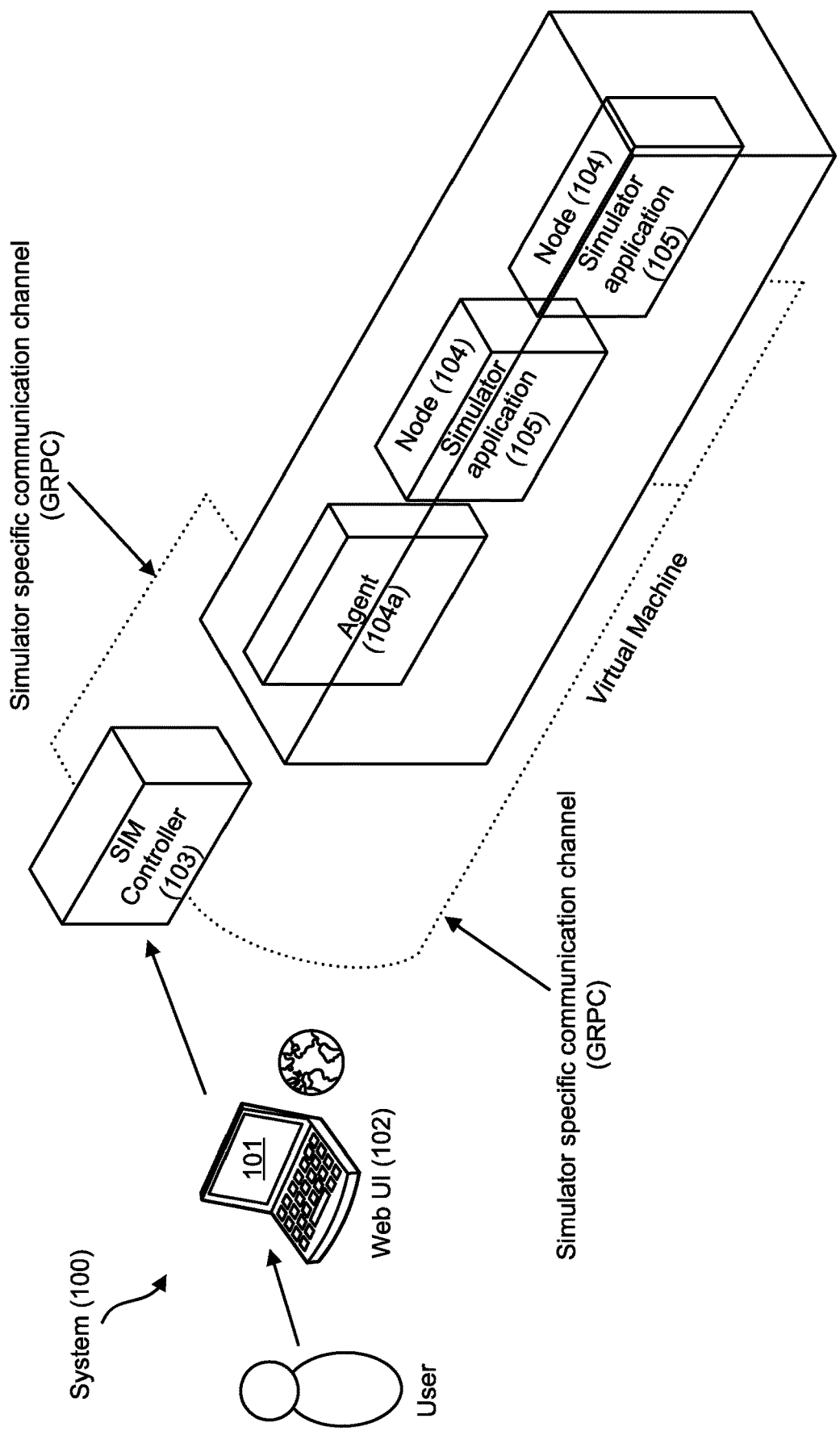
FIG. 1 is an overview of a system for orchestrating simulator application in a wireless network, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In conventional systems of script-based deployment is used for deploying the latest version of proto-files or specifications. Whenever new features are introduced in the node or in the application. A manual updation is performed for every new action introduced. Therefore, the manual updation is a time consuming process and error prone. In the manual updates, if any errors occur, then the user is not able to detect the error until the process is complete. Therefore, there are no feedback systems for letting know the user about the errors at a time of development or at the time error occurred. Also, deploying the updated features is difficult in the conventional systems. Also, available orchestration frameworks are application agnostic, the present method is hybrid model that is suitable for developing application frameworks. Unlike the present method service procedures are automatically controlled using the configured simulator application using the simulator specific communication channel. As the deployment and configuration of the simulator application is automatically generated, the time taken for the deployment is reduced and the error rate is reduced compared to the script-based updating.

Referring now to the drawings, where similar reference characters denote corresponding features consistently throughout the figures, there are shown preferred embodiments.

FIG. 1 is an overview of the system (100), for orchestrating simulator application (105) in a wireless network, according to embodiments disclosed herein.

The simulator applications (105) are simulation models that performs operation of existing or proposed system, providing evidence for decision-making by being able to text different scenarios or process changes.

The wireless network that communicate prior to network association may include mobile communication devices, mobile computing devices, or any other device capable of communicating wirelessly with the wireless network. Such devices may also be referred to as terminals, wireless terminals, stations ("STA") or user equipment, and may also include mobile smart phones, wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc. The network information can be implemented in any environments such as WLAN.

Although the FIG. 1 shows the hardware elements of the system (100) but it is to be understood that other embodiments are not limited thereon. In other embodiments, the system (100) may include less or more number of elements. Further, the labels or names of the elements are used only for illustrative purpose and does not limit the scope of the disclosure. One or more components can be combined together to perform same or substantially similar function.

In an embodiment, the system (100) includes a user device (101), a web User Interface (UI) (102), a simulator controller (SIM controller) (103), an agent (104), and simulator application (105).

The user device (101) includes an electronic circuit specific to a standard that enables wired or wireless communication. The user device (101) is configured for communicating internally between internal hardware components and with external devices via one or more networks. The user device (101) is configured to display a simulator orchestration interface on the user device (101) for orchestrating simulator application (105) in the wireless network. The orchestration is the process of automating a process or workflow that involves many steps across multiple disparate systems. When the processes are automated, they can then be orchestrated to run automatically.

In an embodiment, a control engineer may utilize a library of one or more software modules to create or define a control system application. For example, the web UI (102) can be used to display the simulator orchestration interface for orchestrating simulator application (105). The UI (102) can include one or more simulator application (105). The web UI (102) may display information such as but not limited to a login page for performing the orchestration, a 5GC setup that is taken as an example and the UI (102) displays the information for example a number of application deployed, a number of simulations performed, a number of subscribers present, a number of registered hosts and the like. Also, the web UI (102) shows the complete simulation for the applications selected for the orchestration. In addition, a user can utilize drag-and-drop and other graphic display methods to select the appropriate modules and connect and configure them to design the applications as and when required.

The UI (102) is used by the user of the tool to perform following actions on the simulator (s) which includes but are not limited to: install/uninstall, start/stop, configure, invoke procedures and perform configuration of the system (100) via the agent (104).

The SIM controller (103) is used for providing necessary backend support for the UI (102). The SIM controller (103) is used to execute a predefined set of tasks sequentially to provide user a feel of executing a simulation. The SIM controller (103) includes the electronic circuit specific to the standard that enables wired or wireless communication. The SIM controller (103) is configured for communicating internally between internal hardware components and with external devices via one or more networks. The SIM controller (103) is configured to display the simulator orchestration interface on the user device (101) for orchestrating simulator application (105). The simulator application (105) is deployed on nodes (104) and the proto-files from the nodes (104) are retrieved to configure the deployed simulator application (105) based on service configuration parameters mentioned in the retrieved proto-file. The configured simulator application (105) is used to automatically control the service procedures on the nodes (104). The service procedures can be for example the configuration parameters of the 5GC or any other simulator applications (105).

The SIM controller (103) is a gRPC orchestrator for simulators, where the mode of communication and control is primarily over gRPC. The SIM controller (103) is configured to deploy different types of the simulator application (105) (irrespective of the language they are implemented in) in any VM environment and perform the health check of the simulator applications (105) (whether they are running or not). The SIM controller (103) is configured to provide network topology showing the connectivity between different simulator applications (105), comprises ability to configure the simulator applications (105) for operation by depending on a configuration message, ability to get statistics from the nodes (104), ability to trigger procedures on the nodes (104), provide automated UI form generation for configuration and procedures to be triggered on the nodes (104).

Requirements from IDL used by the SIM controller (103):
1. Should be able to define message structure. Message is logical grouping of fields and its corresponding data type. It relates closely to a structure in C.
2. Should be able to specify mandatory or required parameters.
3. Validation of field parameters is optional but desired.
4. Should be able to define remote procedure calls.
5. Development support in multiple programming language, is desired.
6. Having eBNF grammar is added advantage, which opens up possibility to write custom compilation of IDL.
7. Based on the above-mentioned requirements gRPC and protobuf is selected for the use case (example only but is not a limitation).

Further, the system (100) design can be implemented using other IDL like for example but not limited to: OpenAPI, SOAP, Yang, Thift, FlatBuffer etc. The IDL must support ability to define remote procedure calls.

An example proto-file is provided below:

```
syntax = "proto2";
package samplesim;
message Empty {
}
message Proc1Request {
   optional string param1 = 1;
   required int64 param2 = 2 [default = 100];
}
message Proc1Response {
   required bool status = 1;
}
message Config1Request {
   optional string param1 = 1;
   required int64 param2 = 2 [default = 100];
}
message Config1Response {
   required bool status = 1;
}
message Stat1Statistics {
   optional int64 field1 = 1;
   optional bool field2 = 2;
}
service ProcedureSvc {
   rpc Proc1(Proc1Request) returns (Proc1Response) {
      // Instructs Simulator To Run Proc1
   }
}
service ConfigurationSvc {
   rpc Config1(Config1Request) returns (Config1Response) {
      // Configures Simulator With Config1 Parameters
   }
}
service StatisticsSvc {
   rpc Stat1(Empty) returns (Stat1Statistics) {
      // Instructs Simulator To Run Proc1
   }
}
service ManagementSvc {
   // Optional, Used For Custom Operations On Simulator.
   // A Custom UI Can Be Built Surrounding This Service.
}
service HealthSvc {
```

```
    // Optional, Used For Exposing Health Of Simulator
}
service InternalSvc {
    // Optional, Used For East West Communication
}
```

The simulator application (105) is an application which performs set of operation(s) that can be used for testing a DUT (software or hardware). Each simulator application (105) comprises a unique proto file. Messages that are shared across multiple simulator applications (105) can be kept in common proto file, and imported by simulators proto file. RPCs defined in proto file uniquely represent the procedures supported by the simulator application (105). The simulator application (105) can be implemented in any language which is supported by gRPC and protobuf (c++, java, golang, python etc.) The simulator application (105) needs to implement a call home model of registering its listening server port with the orchestrator. The simulator application (105) is any application which support at least one of the following mandatory services which includes but is not limited to: configuration service, procedure service, statistics service and optional services which includes but is not limited to: management service, internal service and health service.

The configuration service produces all the RPCs that are used for configuring a simulator by the configuration service. The procedure service produces all the RPCs that are used for making a simulator perform certain action. These RPCs can correlate to 3GPP defined procedures.

The statistics service produces all the RPCs that are used for getting current snapshot of statistics from a simulator. The management service produces all the RPCs that can be used to modify the state of the simulator at run-time. The internal services are not used by the orchestrator, they are used for internal communication between other simulators (E/W Communication). The health service gives back any internal health information of the simulator. At the least it should reply whether the application is healthy or not. The criteria for health can be simple as an ok, or detailed as some specific information.

The nodes (104) can be, for example but not limited to a server node or an architecture and an instance of a virtualized control server system that implements the functionality of edge control server system that implements functionality of edge control devices. In an example, the server node may include various virtual machine aspects that work together via the hypervisor layer and operate with the functions of host operating system and a computer hardware architecture. The node (104) can be used to implement various aspects of orchestration, including both machine orchestration and operational application orchestration.

The agent (104a) of the system (100) collects information about the available resources of the user device (101) and reports the information to the other simulator application (105) in the server nodes (104). a login page for performing the orchestration, a 5GC setup that is taken as an example and the UI (102) displays the information for example a number of application deployed, a number of simulations performed, a number of subscribers present, a number of registered hosts and the like.

The agent (104a) is used for managing a virtual machine or server. The agent (104a) can be used to perform at least one of: start an application, stop an application, monitor health of the application, report health of the virtual machine or server, configure IP Addresses or routes in the system (100), start and stop packet capture in the system (100).

The simulator includes various modules and various module options, having the use of alternative application modules with one or more defined options in the simulator or another simulator configuration. The modules are selection of independent electronic circuits packaged onto a circuit board to provide a basic function. In the simulator application (105), execution of alternative application modules can be repeated for multiple different software modules and multiple options. An operation of the orchestration module determines the available applications and application specifications and the software module configuration using one or more module manifests. Run the application module and at least one alternative application module with options defined in the simulator to implement multiple orchestration scenarios, define multiple orchestration scenarios via a characterization controller, and run multiple orchestration scenarios in the simulator.

Figure 2:
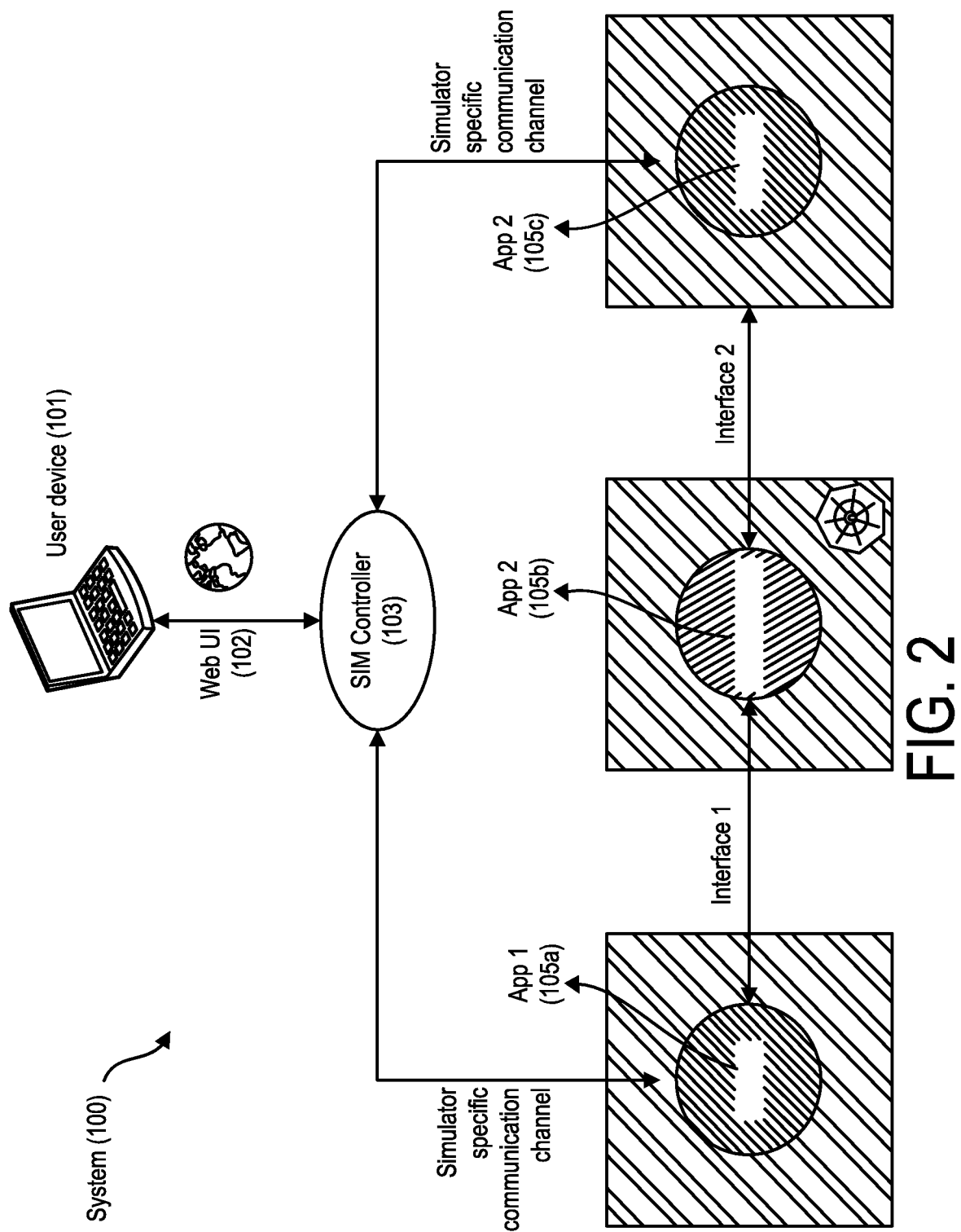
FIG. 2 is an exemplary system for orchestrating simulator application in the wireless network, according to the embodiments herein.

FIG. 2 is an exemplary system for orchestrating simulator application (105), according to the embodiments herein.

In an example, the simulator application (105) can be for example any 5G related application including but not limited to: $5^{th}$ Generation core network simulator (5GC SIM), a New Radio Distributed Unit simulator (NRDU SIM), Distributed Unit Simulator (DU SIM), gNodeB simulator (gNB SIM), MUCE, Network Configuration Protocol simulator (NETCONF SIM), Paging SIM, User Equipment simulator (UE SIM) and the like. However, the above example is used to illustrates the various applications and does not limit the scope to 5G communication domain alone. The proposed method can be extended to any domain.

The system (100) includes the user device (101), the web UI (102), the SIM controller (103), and applications (105a to 105 n).

The user device (101) includes the electronic circuit specific to the standard that enables wired or wireless communication. The user device (101) is configured for communicating internally between internal hardware components and with external devices via one or more networks. The user device (101) is configured to display the simulator orchestration interface on the user device (101) for orchestrating simulator application (105) in the wireless network. The user device (101) may be but not limited to a laptop, a palmtop, a desktop, a mobile phone, a smart phone, Personal Digital Assistant (PDA), a tablet, a wearable device, an Internet of Things (IOT) device, a virtual reality device, a foldable device, a flexible device, a display device and an immersive system.

In an embodiment, the control engineer may utilize a library of one or more software modules to create or define a control system application. For example, the UI (102) can be used to display the simulator orchestration interface for orchestrating simulator application (105). The UI (102) can include one or more simulator application (105). The UI or the web UI (102) may display information such as but not limited to login page for performing the orchestration, 5GC setup that is taken as an example and the UI displays the information for example a number of applications deployed, a number of simulations performed, a number of subscribers present, a number of registered hosts and the like. Also, the web UI (102) shows the complete simulation for the applications selected for the orchestration. In addition, the user can utilize drag-and-drop and other graphic display methods to select the appropriate modules and connect and configure them to design the applications as and when required.

The SIM controller (103) includes the electronic circuit specific to a standard that enables wired or wireless communication. The SIM controller (103) is configured for communicating internally between internal hardware components and with external devices via one or more networks. The SIM controller (103) communicates with the plurality of simulator applications (105) using the simulator specific communication channel. The SIM controller (103) is configured to display the simulator orchestration interface on the user device (101) for orchestrating simulator application (105). The simulator application (105) is deployed on nodes (104) and proto-files from the nodes (104) are retrieved to configure the deployed simulator application (105) based on the service configuration parameters mentioned in the retrieved proto-file. The configured simulation application is used to automatically control service procedures on the nodes (104).

The nodes (104) can be for example but not limited to the server node or the architecture and the instance of virtualized control server system that implements the functionality of edge control server system that implements the functionality of edge control devices. In an example, the server node may include various virtual machine aspects that work together via the hypervisor layer and operate with the functions of the host operating system and the computer hardware architecture. The server node can be used to implement various aspects of orchestration, including both machine orchestration and operational application orchestration.

In an embodiment, the nodes (104) can include for example simulator applications (105) performing dedicated tasks. In FIG. 2, the server applications or the applications (105) can be but not limited to the DU SIM, NNGCU (DUT) and 5GC SIM.

In an embodiment, the simulator applications (105) communicates with each other using different interfaces (interface 1 and interface 2). The interfaces for example can be F1 interface, N2/N3 interface. The F1 interface defines interconnection of a gNodeB centralized unit and gNodeB distributed unit (gNB-CU and a gNB-DU) supplied by different manufacturers. The N2 interface supports control plane signaling between Radio Access Network (RAN) and 5G core covering scenarios related to the User Equipment (UE) context management, Packet Data Unit (PDU) session/resource management procedures. The N2 uses Stream Control Transmission Protocol (SCTP) (NGAP) between 5GCN and access network. The 5G N3 interface performs the role of conveying user data from the RAN to the User Plane Function (UPF), making it possible to create both low- and high-latency services. The 5G N3 replaces the SI-U interface from the 4G Evolved Packet Core (EPC) and is key for supporting the new CUPS architecture, with distributed user data processing.

The simulator applications (105) communicates with the SIM controller (103) with the simulator specific communication channel. The SIIM controller (103) controls the applications (104) using the web UI (102) of the user device (101).

Figure 3:
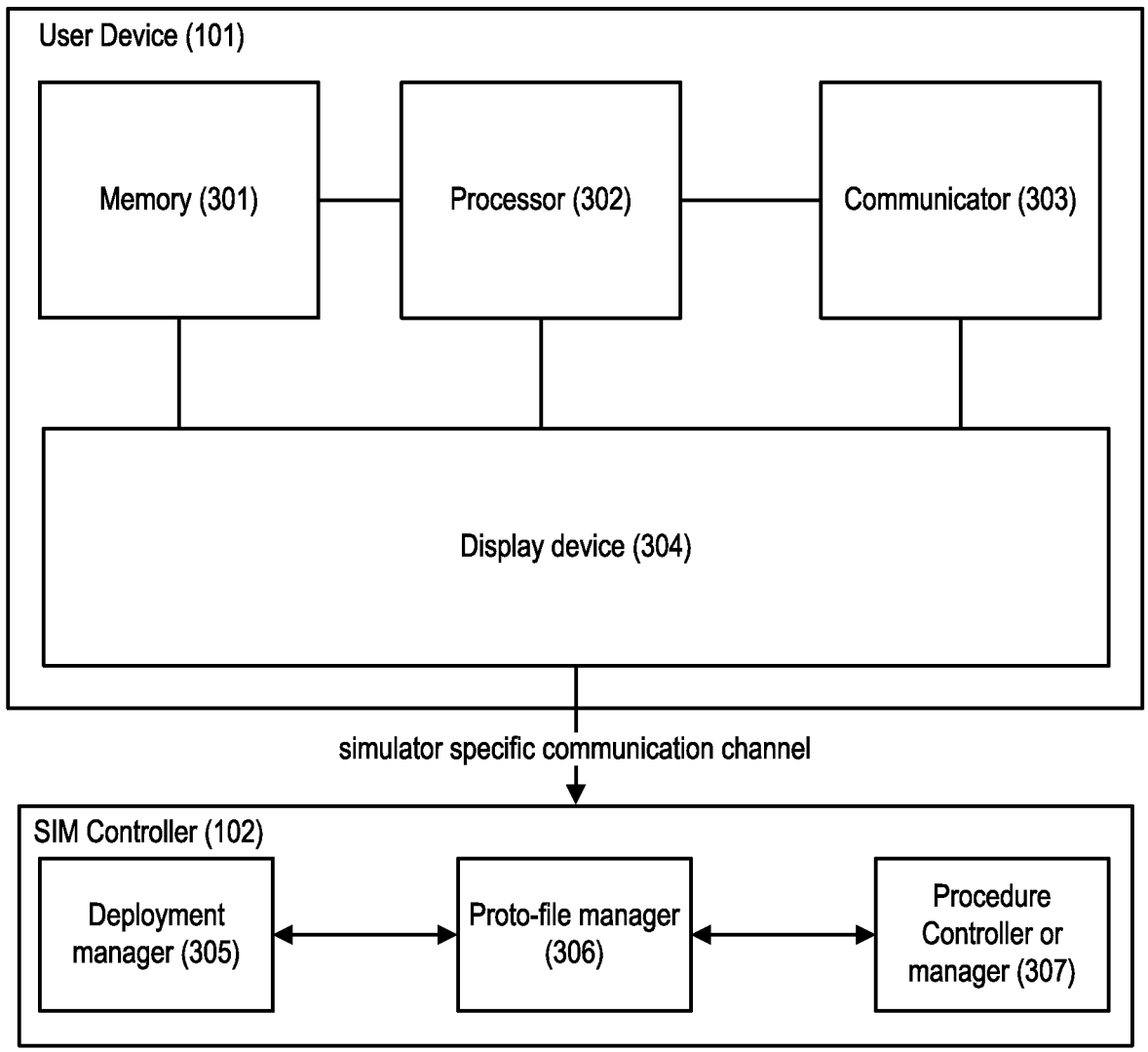
FIG. 3 is a block diagram of communication between a user device and a SIM controller for orchestrating simulator application, according to the embodiments disclosed herein.

FIG. 3 is the block diagram of the communication between user device (101) and SIM controller (103) for orchestrating the simulator application (105), according to the embodiments disclosed herein.

The user device (101) includes a memory (301), a processor (302), a communicator (303), and a display device (304). The SIM controller (103) includes a deployment manager (305), a proto-file (306) and a procedure controller or manager (307).

The memory (301) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (101) may, in some examples, be considered a non-transitory storage medium. The term "non-transitory" may indicate that the storage medium is not embodied in a carrier wave or a propagated signal. However, the term "non-transitory" should not be interpreted that the memory (301) is non-movable. In some examples, the memory (301) is configured to store larger amounts of information. In certain examples, a non-transitory storage medium may store data that can, over time, change (e.g., in Random Access Memory (RAM) or cache). The memory (301) stores information related to but not limited to simulator applications (105) to be deployed or controlled or configured. The memory (301) can store proto file, service configuration parameters, service procedures, information about a plurality of attributes received from the user, performance statistics of the service procedures.

In an embodiment, the processor (302) may include one or a plurality of processors. The one or the plurality of processors (302) may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). The processor (302) may include multiple cores and is configured to execute the instructions stored in the memory (301). The processor (302) is configured to execute instructions stored in the memory (301) and to perform various processes. The processor (302) receives inputs from the simulator application (105) to display the simulator orchestration interface. The proto-files having service configuration parameters are retrieved from the nodes (104) or virtual machines or server nodes. The deployed simulator application (105) is configured on the nodes (104) based on the service configuration parameters mentioned in the retrieved proto-file from the nodes (104).

In an embodiment, the communicator (303) includes the electronic circuit specific to the standard that enables wired or wireless communication. The communicator (303) is configured to communicate internally between internal hardware components of the user device (101) and with external devices via one or more networks. The communicator (303) can performs controlling the service procedures automatically on the node (104) using simulator application (105).

In an embodiment, the display device (304) is configured to display the simulator orchestration interface on the user device (101) for orchestrating simulator application (105) in the wireless network. In some optional examples, various input/output (I/O) devices may be present within or connected to the IoT device. For example, a display or other output device may be included to indicate information such as sensor readings or actuator positions. Input devices such as touch screens or keypads can be included to accept input. The output device may include any number of simple visual outputs, such as binary status indicators (e.g., LEDs) and multi-character visual outputs, or more complex outputs, such as display screens (e.g., LCD screens). The output device can include a format audio or visual display, and outputs such as characters, graphics, multimedia objects, etc. are generated or produced from the operation of the IoT device.

The deployment manager (305) deploys the simulator application (105) from the plurality of displayed simulator applications (105) on the nodes (104). The simulator applications (105) can be the DU SIM, NNGCU (DUT) and 5GC SIM and the like. The deployment manager (305) allows a large number of applications (105) to be deployed. The deployment manager (305) can include the electronic circuit specific to a standard that enables wired or wireless communication.

The proto-file manager (306) includes but not limited to the configuration information, list of subscribers, start NFs, stop NFs, message lists, specifications and the like. The proto-file can be a compatibility report. The compatibility report includes the information related to the application such as (if the proto-files of the application is in the latest or updated version or not). The proto-file information is retrieved from the simulator application (105) using the simulator specific communication channel.

The procedure controller or manager (307) can include the electronic circuit specific to a standard that enables wired or wireless communication. The procedure controller is configured to control the service procedures on the nodes (104) using the configured simulator application (105) using simulator specific communication channel. The service procedures are automatically controlled on the nodes (104) using configured simulator application (105). The service procedures can be for example the configuration parameters of the 5GC or any other simulator applications (105).

Figure 4:
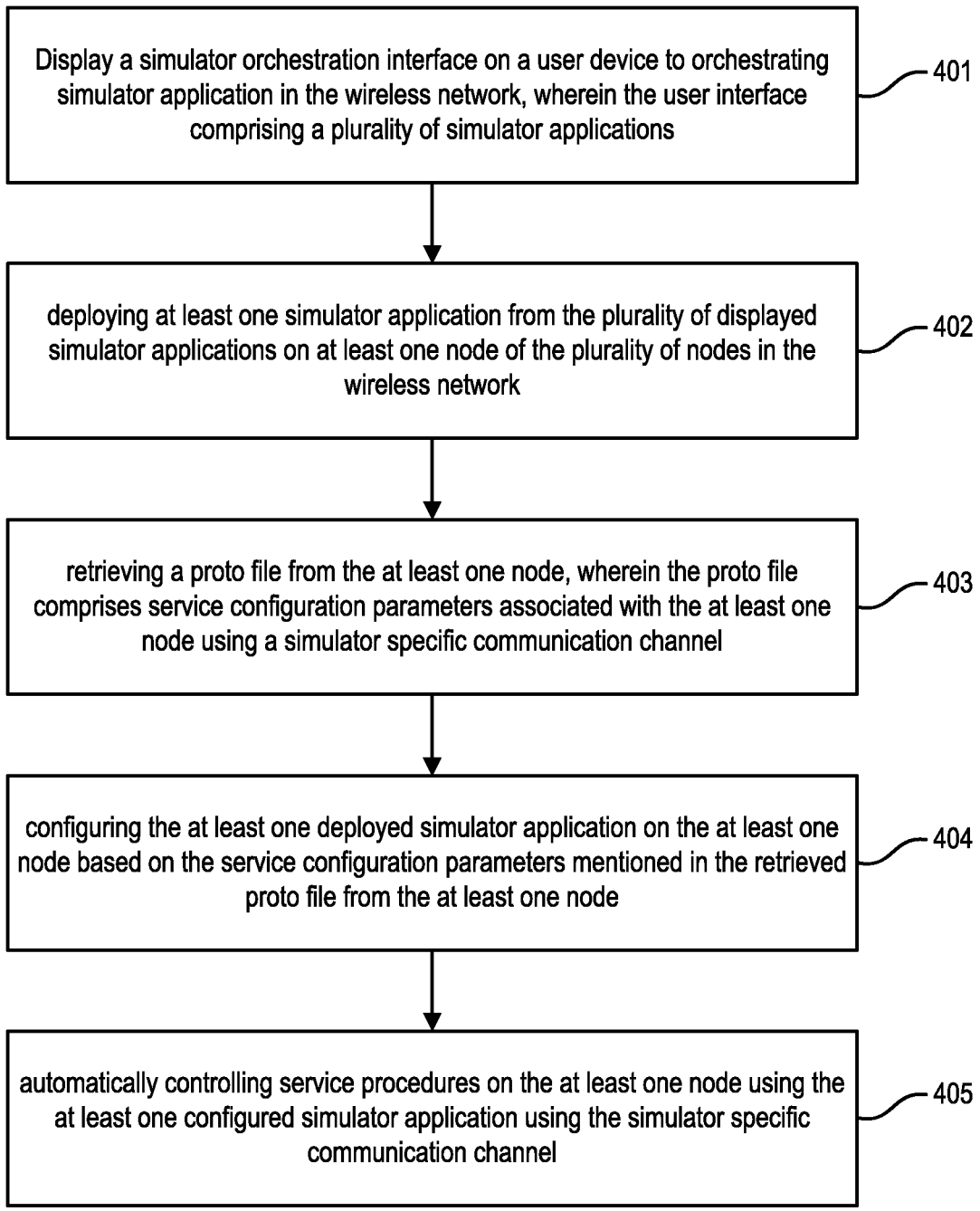
FIG. 4 is a flow diagram of the system for orchestrating simulator application in the wireless network, according to the embodiments disclosed herein.

FIG. 4 is the flow diagram of the system (100) for orchestrating simulator application (105) in the wireless network, according to the embodiments disclosed herein.

At step 401, the simulator orchestration interface is displayed on the user device (101) for orchestrating simulator application (105) in the wireless network. The user interface (102) includes the plurality of simulation applications (105). The simulator orchestration interface discloses the information related to but not limited to the number of simulation applications (105) in the nodes (104), simulation configuration interface, simulator flow control interface, simulator orchestration interface and the like.

At step 402, the simulator application (105) is deployed on the node (104) in the wireless network. The simulator application (105) can be more than one application. More than one simulations can be performed on one simulator application (105) or multiple application. The simulator application (105) can be added or deleted using the simulator orchestration interface. For the deployment process the simulator application (105) needs to be connected with the node (104). The communication establishment can be performed by configuring the simulator application (105). The configurations can be for example, the node name, server IP address, login credential, passwords, GRPS port and the like.

At step 403, the proto-file is retrieved from the node (104). The proto-file comprises service configuration parameters associated with the node (104) using the simulator specific communication channel. The service configuration parameters can be the information related to the application (such as, if the proto-files of the application are is in the latest or updated version or not). The proto-file information is retrieved from the simulator application (105) using the simulator specific communication channel.

At step 404, the deployed simulator application (105) is configured on the node (104) based on the service configuration parameters mentioned in the retrieved proto-file from the node (104). The simulator applications (105) can be the DU SIM, NNGCU (DUT) and 5GC SIM. The deployment manager (305) allows a large number of applications to be deployed. The configuration information can be for example, the node name, server IP address, login credential, passwords, GRPS port and the like.

In an embodiment, the deployed simulator application (105) on the node (104) is configured based on the service configuration parameters mentioned in the retrieved proto-file from the node (104). The simulator configuration interface is dynamically generated and displayed based on the service configuration parameters mentioned in the retrieved proto-file from the node (104). The simulator configuration parameters are mentioned in the retrieved proto-file from the node (104). The user input is received from the user device (101) corresponding to the plurality of attributes corresponding to the service configuration parameters mentioned in the retrieved proto-file from the node (104). The deployed simulator application (105) is configured based on the user input received in the attributes displayed in the simulation configuration interface.

In an embodiment, deploying the simulator application (105) from the plurality of the displayed simulator applications (105) on the node (104) includes detecting the simulator application (105) selected by the user device (101). The network diagram is created and displayed corresponding to the selected simulator application (105) in the workspace of the simulator orchestration interface. The connection is established with the node (104) to deploy the selected simulator application (105) and the input is received from the user device (101) on the network diagram to deploy the selected simulator application (105). The selected simulator application (105) is automatically installed on the node (104) after establishing the connection. The deployed indication is displayed on the network diagram corresponding to the installed simulator application (105) on the node (104).

At step 405, the service procedures are automatically controlled on the at least one node (104) using the configured simulator application (105) using the simulator specific communication channel. The service procedures can be for example the configuration parameters of the 5GC.

In an embodiment, the service procedures are automatically controlled on the node (104) using the configured simulator application. The simulator flow control interface includes displaying the service procedures on the simulator orchestration interface. The performance statistics of the service procedures are stored in the memory (301).

Figure 5:
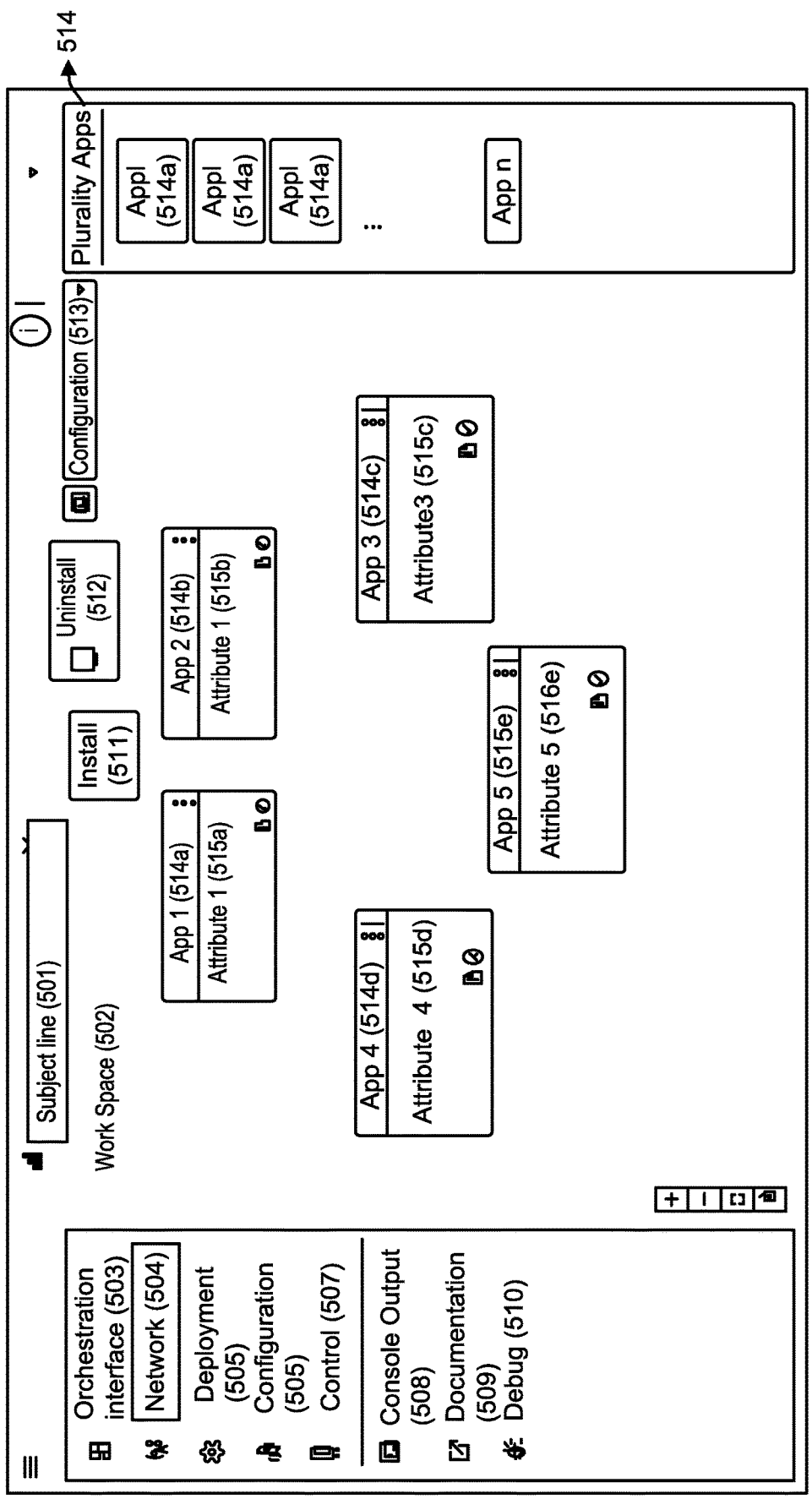
FIG. 5 illustrates an exemplary workspace displaying simulator application selection for orchestrating simulator application, according to the embodiments disclosed herein.

FIG. 5 illustrates an example of the workspace (502) or network diagram (502) displaying the plurality of simulator applications (105a-105 n) selection, according to the embodiments disclosed herein.

Figure 6:
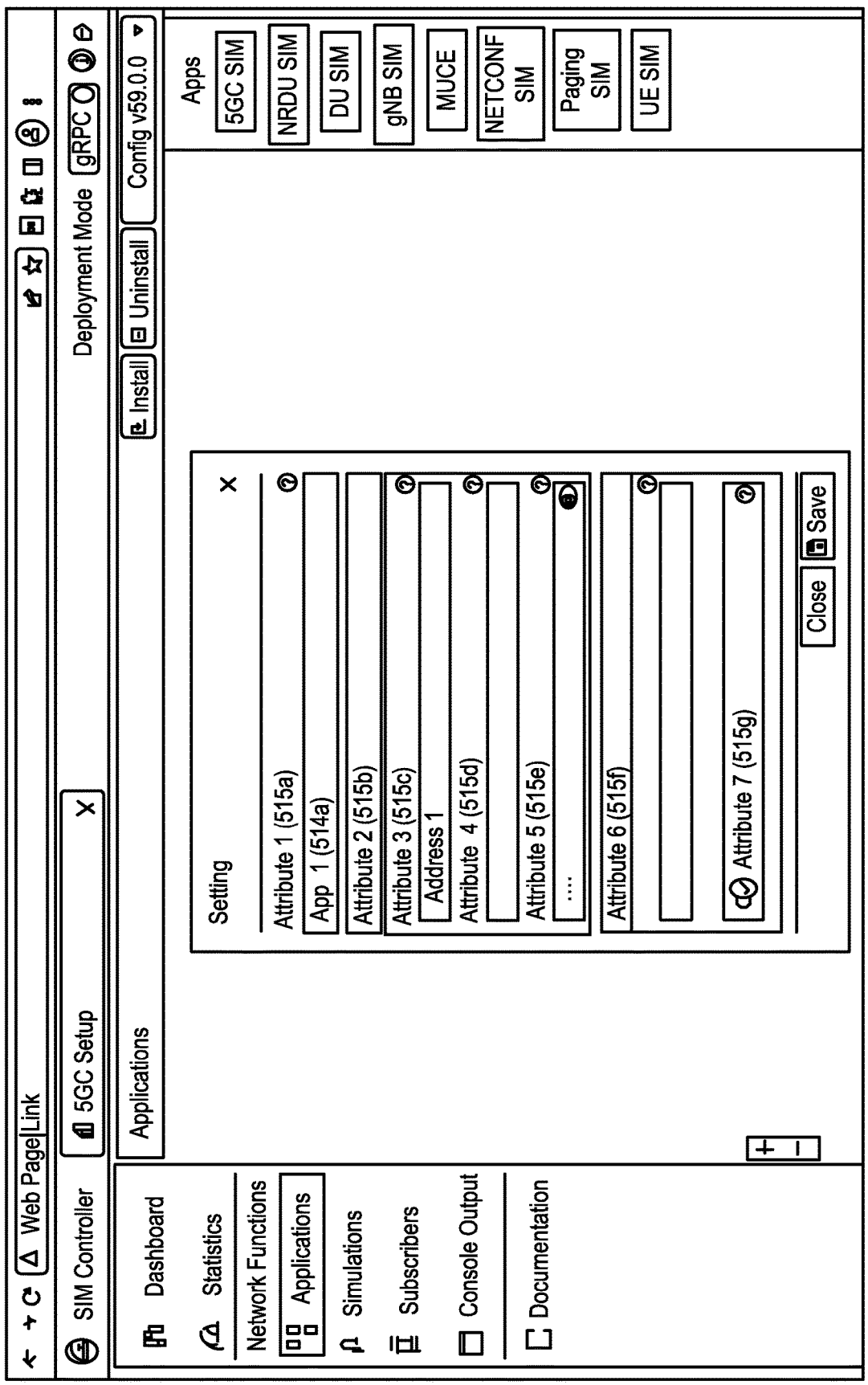
FIG. 6 illustrates an example of configuration interface for a selected application for orchestrating simulator application, according to the embodiments disclosed herein.

The network diagram (502) is the layout of the simulator applications that have to be deployed in the nodes (104). Each of the applications are represented using icons where the SSH username and password and the target machine address is configured. The application icons allow the user to call the Configuration Service APIs as well as provide status about the state of the application (alive/dead). The workspace (502) can be the simulator orchestration interface displaying various fields. The SIM controller (103) is logged in by giving the credentials for performing the orchestration. The simulator orchestration interface can also be referred as a console. The console displays the set of nodes (104) or virtual machines that can be connected to the simulation controller (not shown in FIGs). In the console, the network functions includes the set of features that can be used to perform the actions such as configuration (506), deployment (505) and control (507). Under the deployment action (505), applications to be deployed are selected in the workspace (501). The applications (1-n) in the FIG. 5 are selected from the plurality of nodes (104) or virtual machine from the server node. Applications can be but not limited to for example 5GC. The simulator application (1-n) can be added or deleted using the simulator orchestration interface. For the deployment process the application (1-n) needs to be connected with the node (104). To connect with nodes (104), plurality of configurations (506) are made to the selected application (1-n) as shown in FIG. 6. The FIG. 5 includes the work space (502) and within the workspace (502) the multiple application such as app 1, app 2 to app n are selected. The applications can vary from 1 to n. The applications (1-n) can be selected twice. The applications (1-n) may include the plurality of attributes. The attributes include identification for the particular server node to which the application is connected. The UI (102) can include various options such as install (511), uninstall (512), configuration pane (513) and subject line (501). The subject line indicates the file name.

In an embodiment, the communication with the node (104) is established to deploy the selected simulator application (1-n). The node configuration interface is displayed on the simulation orchestration interface. The node credentials are received to login into the node configuration interface. The connection is established with the node (104) to deploy the selected simulator application (105) based on the node credentials. The connection with the node (104) is performed using the agent (104). The agent (104) collects the information about the available resources of the nodes (104) and reports the information back to the orchestration interface.

In an embodiment, the selected applications (app1-app n) can be one or more than one based on the user. The selected applications can be the DU SIM, NNGCU (DUT) and 5GC SIM and the like.

FIG. 6 illustrates the example of configuration interface for the selected application for orchestrating the simulator application (105). The communication establishment can be performed by configuring the simulator application (105). The configuration settings includes the selected application. The selected application can be 5GC application. The configuration (506) includes the node (104) to which the selected application will be connected or on which node (104) the application will be deployed. The configurations (506) can be for example, the node name, server IP address, login credential, passwords. GRPS port and the like. The configuration (506) includes the different attributes as shown in FIG. 6. The attributes can be node name, server configurations, login credentials, network configurations, port configurations and the like.

Figure 7:
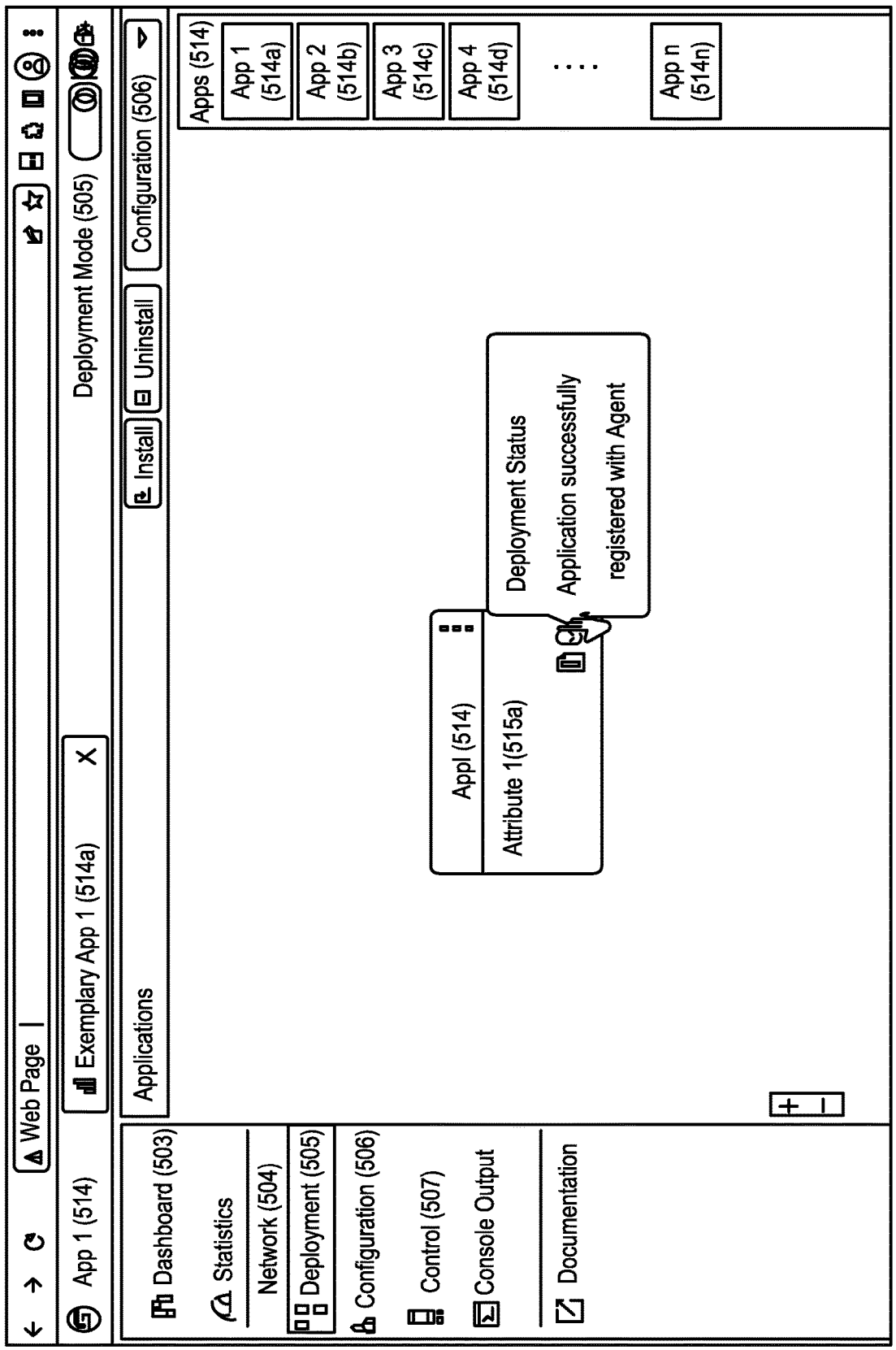
FIG. 7 illustrates an example showing deployment status of the selected application for orchestrating simulator application, according to the embodiments disclosed herein.

FIG. 7 illustrates the example showing deployment status of the selected application for orchestrating simulator application (105), according to the embodiments disclosed herein. The deployment status can be popped in once the connection between the selected application and the node (104) is established. Once the deployment (505) is successful the interface displays the message of the successful registration with the agent (104). The agent (104) can be the node (104), virtual machine. The successful registration of the application indicates that the node (104) and the selected application are in communication with each other. Once the registration is successful, the user can check for the compatibility report of the connected application. The compatibility of the connected application indicates that the simulator controller (103) can retrieve the updated file or the latest version of proto-files from the application. If the simulator controller (103) is the updated or in the latest version then the status is indicated with green else the status is indicated as red. The indication colors can be any color in the visible spectrum.

In an embodiment, the selected application is configured, deployed and controlled using the user device (101). The selected application can be for example deployed in one of the nodes (104) or virtual machines.

Figure 8:
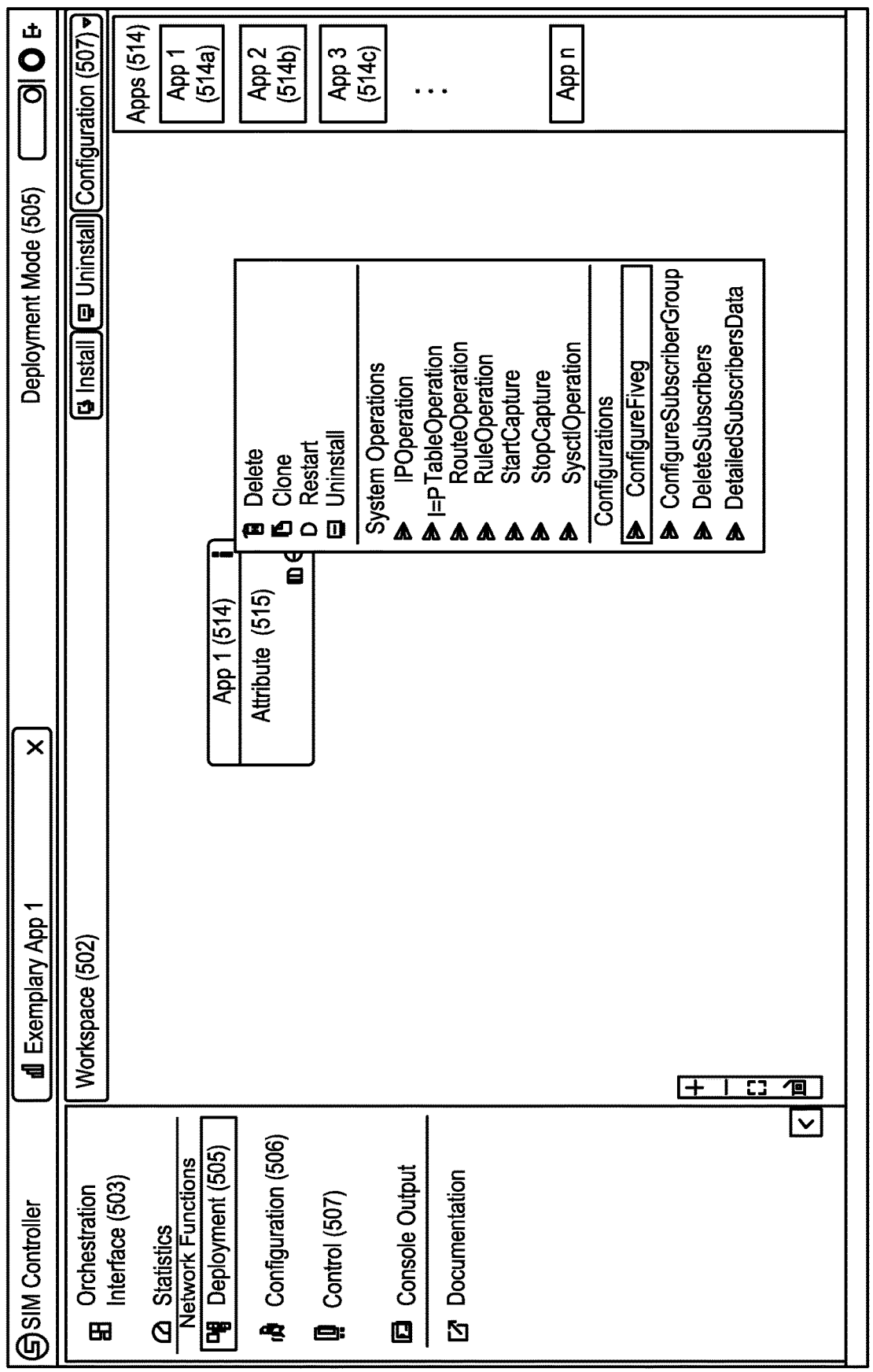
FIG. 8 illustrates an example showing configuration option for the selected application for orchestrating simulator application, according to the embodiments disclosed herein.

FIG. 8 illustrates the example showing configuration (506) option for the selected application for orchestrating simulator application (105), according to the embodiments disclosed herein. The workspace (502) in the FIG. 8 include applications such as the DU SIM, NNGCU (DUT) and 5GC SIM and the like. The deployment (505) includes displaying the simulator orchestration interface on the user device (101) to orchestrating simulator application (105) in the wireless network. The user interface (102) includes the plurality of simulator application (105). The simulator application (105) is deployed from the plurality of displayed simulator applications on the node (104) of the plurality of the nodes (104) in the wireless network. The proto-file is retrieved from the node (104) and the proto-file includes service configuration parameters associated with the node (104) using the simulator specific communication channel. The deployed simulator application (105) on the node (104) based on the service configuration parameters mentioned in the retrieved proto-file from the node (104). The service procedures are automatically controlled on the node (104) using the configured simulator application (105) using the simulator specific communication channel.

In an embodiment, the application controlling feature includes various options to be performed, such as delete, clone, restart, uninstall. Further, the simulator controller (103) provides multiple controlling actions or services such as system operations and configurations (506). The system operations for example can include IPOperation, IPTableOperation, RouteOperation, RuleOperation, RuleOperation, StartCapture, StopCapture, SysctlOperation. The configuration (506) operations can include for example ConfigureFiveg, ConfigureSubscriberGroup and DeleteSubscriberData.

In an embodiment, the deployed simulator application (105) is configured on the node (104) based on the service configuration parameters mentioned in the retrieved proto-file from the node (104). The simulator configuration interface is dynamically generated and displayed based on the service configuration parameters mentioned in the retrieved proto-file from the node (104). The simulator configuration interface includes one or more attributes corresponding to the service configuration parameters mentioned in the retrieved proto-file from the node (104). The user input is received from the user device (101) corresponding to the attributes corresponding to the service configuration parameters mentioned in the retrieved proto file from the node (104). The deployed simulator application (105) is configured on the node (104) based on the user input received in the attributes displayed in the simulator configuration interface.

Figure 9:
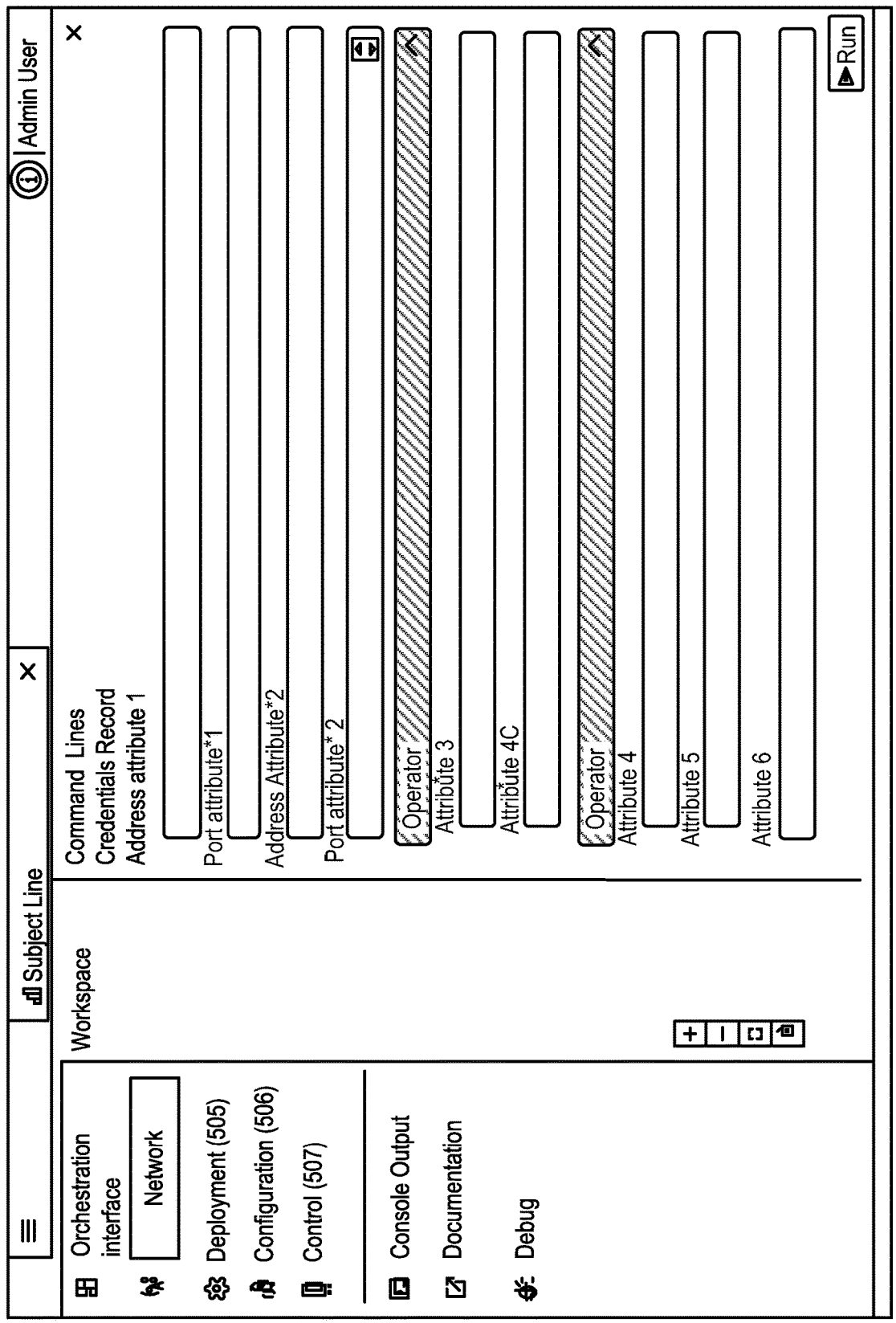
FIG. 9 illustrates an example providing credentials for one of the node communicating between user device and the node for orchestrating simulator application, according to the embodiments disclosed herein.

FIG. 9 illustrates the example providing credentials for one of the node communicating between the user device (101) and the node (104) for orchestrating simulator application (105), according to the embodiments disclosed herein. The service procedures are controlled automatically on the node (104) using the configured simulator application (105). A simulation flow control interface including the service procedures on the simulator orchestration interface is displayed. The service procedures are allocated to be performed on the node (104). The performance statistics of the node (104) is received for the allocated service procedures. The performance statistics of the service procedures are displayed on the simulator orchestration interface. The performance statistics of the service procedures are stored in the memory.

In an embodiment, the credentials record includes for example multiple address attribute, operator information, node name, server configuration, IP address and the like. The node name can be for example, 5GC simulator application. The 5GC configuration includes PDN support, GTPU address, NG application protocol (NGAP) address, Public Land Mobile Network (PLMN), security and integrity mechanism, S-NSSAI, DNN names, supported DNN names, TACs. The SSH server configuration can include server IP address, login and password.

In an embodiment, the proto-file considers for example 5G configuration as input and provides the configuration response as output. The user device (101) retrieves the information about the proto-file from the control simulator (103). As shown in FIG. 9, the 5GC configuration includes attributes (1-n) such as address parameter, login details, database name, protocol name, and security and integrity mechanism.

Figure 10:
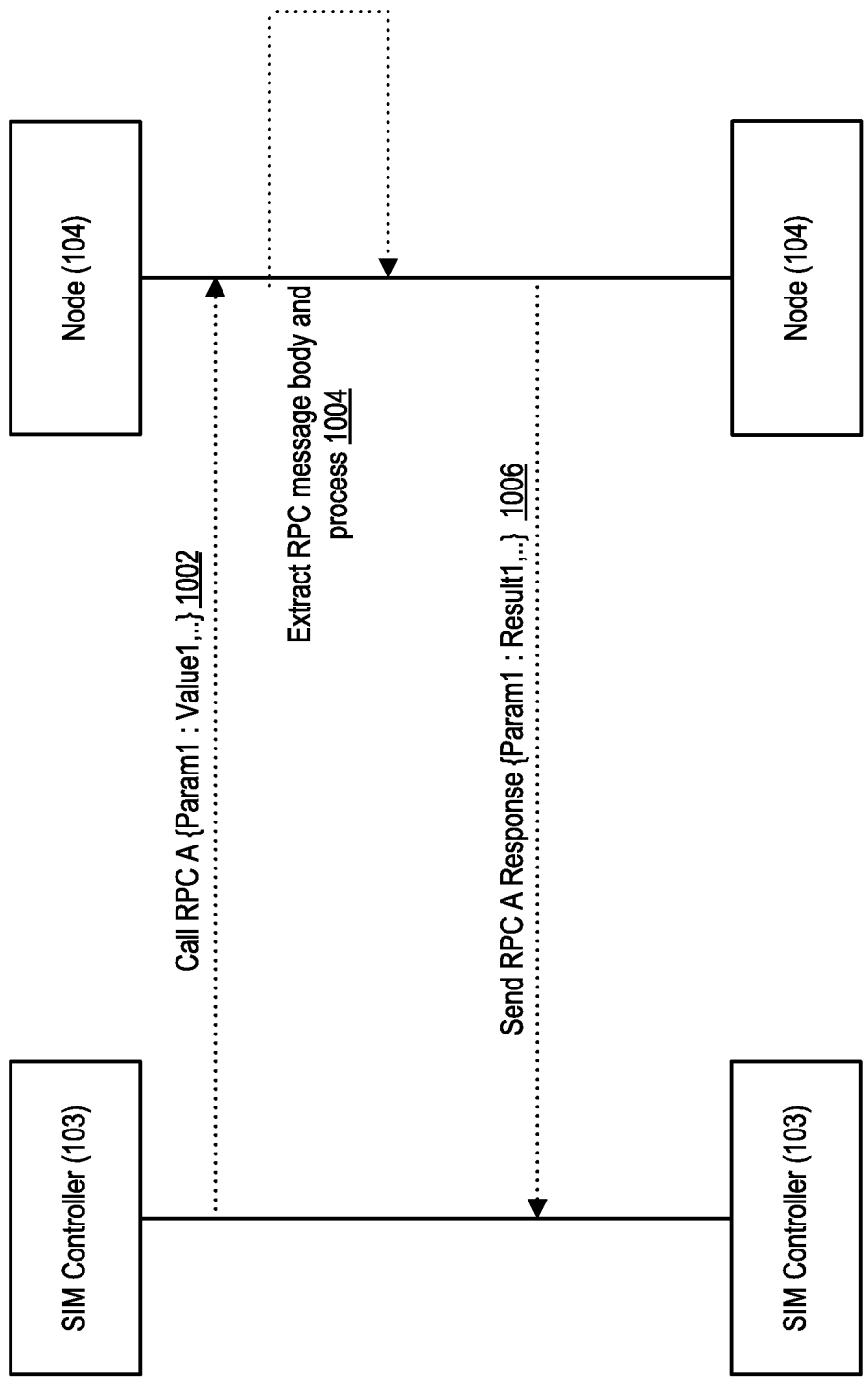
FIG. 10 is a flow diagram illustrating communication from the SIM controller to the nodes, according to the embodiments disclosed herein.

FIG. 10 is a flow diagram illustrating communication from the SIM controller (103) to the nodes (104), according to the embodiments disclosed herein.

Referring to the FIG. 10, all communication from the UI (102) goes to the simulation nodes (104) via the SIM controller (103). The communication between the SIM controller (103) and the UI (102) uses REST API and the Payload is JSON. The communication between the SIM controller (103) and the simulation nodes (104) is performed using GRPC Call and the payload is protobuf binary encoding.

The SIM controller (103) performs the encoding/decoding operations from JSON to Protobuf Binary. Further, if any other IDL is used, marshalling JSON to IDL specific encoding/decoding is performed by the SIM controller (103).

At step 1002, Call RPC A {Param1: Value1 ... } is sent from the SIM controller (103) to the simulation node (104). At step 1004, the simulation node (104) extracts the RPC message body and process. Further, at step 1006, the simulation node (104) sends the RPC A Response {Param1: Result1 ... } to the SIM controller (103).

FIG. 11 is an example illustrating form rendering in the system (100), according to the embodiments disclosed herein.

The code generation is used for various scenarios such as for example but not limited to: generating JSON schema far rendering forms far taking user input, generating C++, Golang. Typescript Code (to be used by the simulation nodes (104), the SIM controller (103), UI), event entries are generated so that simulation nodes (104) can notify the SIM controller (103), status of RPC execution and stat entries are also generated so that the SIM controller (103) can continuously populate statistics.

The task engine is used to invoke GRPC call towards simulator endpoint. The task engine performs at least one of validate Input Request in JSON format, make gRPC Call to the simulation nodes (104) and save Response from the simulation nodes (104).

The web application forms are rendered using JSON Schema on the web UI (102). The code generator takes the proto files, generates a JSON Schema far messages that are used far communicating with the simulation nodes (104). For example consider the below proto file:

```
sim_ducp.proto > ..
message FicConfig {
   required string ficip            = 1 [default = "fd02: :0");    //FIC Address
   optional string ficifcName       = 2 [default = "eth1"];        //FIC  Interface
//Protocal Type
enum Protocol {
   E_UDP                            = 0;
   E_TCP                            = 1;
message F1uConfig {
   required   string   f1uIp        "1 [default = "fd02: :O");     //FIU Address
   optional   string   f1uIfcName   = 1 [default = "eth1"];        //FIU  Interface
   required   Protocol protocolType = 3 [default = E_TCP];         //Protocol  Type
   required   uint32  maxrJumDrb    = 4 [default = 4);             //Max DRB
message F1ResetRequest {
   required NrduDesc nrdu
}
|
message Nrduesc {
   required string nrduName         = 1 [default = "nrdu1"];       //NRDU Name
   required uint32 nrduid           = 2 [default = 0);             //NRDU Id
   optional uint32 maxtJumOfUes     = 3 [default = 700];           //Max   UE per DU
   required string cpsilMppIp       = 4 [default = "fd02: :O"];    //Control Plane Simulator Address
   required string upsilMppip       = 5 [default = "fd02: :o"]     //User Plane simulator Address
   optional string cpsimA.ppIfcName = 6 [default = "eth1"];        //Control Plane Simulator
                                                                      Address Interface
   required string muceAppIp        = 7 [default = "fd02: :O"];    //Muce Simulator Address
   required FlcConfig ftcconfig                                    //NRDU FIC configuration
   required Ftuconfig f1uconfig     = 9;                           //NRDU FIU configuration
   required bool isSvdCellsListPresent = 10 [default = true];      //Served Cells List Present
   required uint32 DuSvcCellCount   = 11 [default = 1];            //DU Service Cell Count
   repeated servicecellrnfo         = -12;                         //Service cell configuration
message NRDUTemplate {
   required Nrudesc desc            = - 1;
message NRDUList {
   required Nrudesc descs           = - 1; //NRDU Management
```

The FIG. 11 illustrates the auto-generated UI form for the corresponding proto file.

Figure 12:
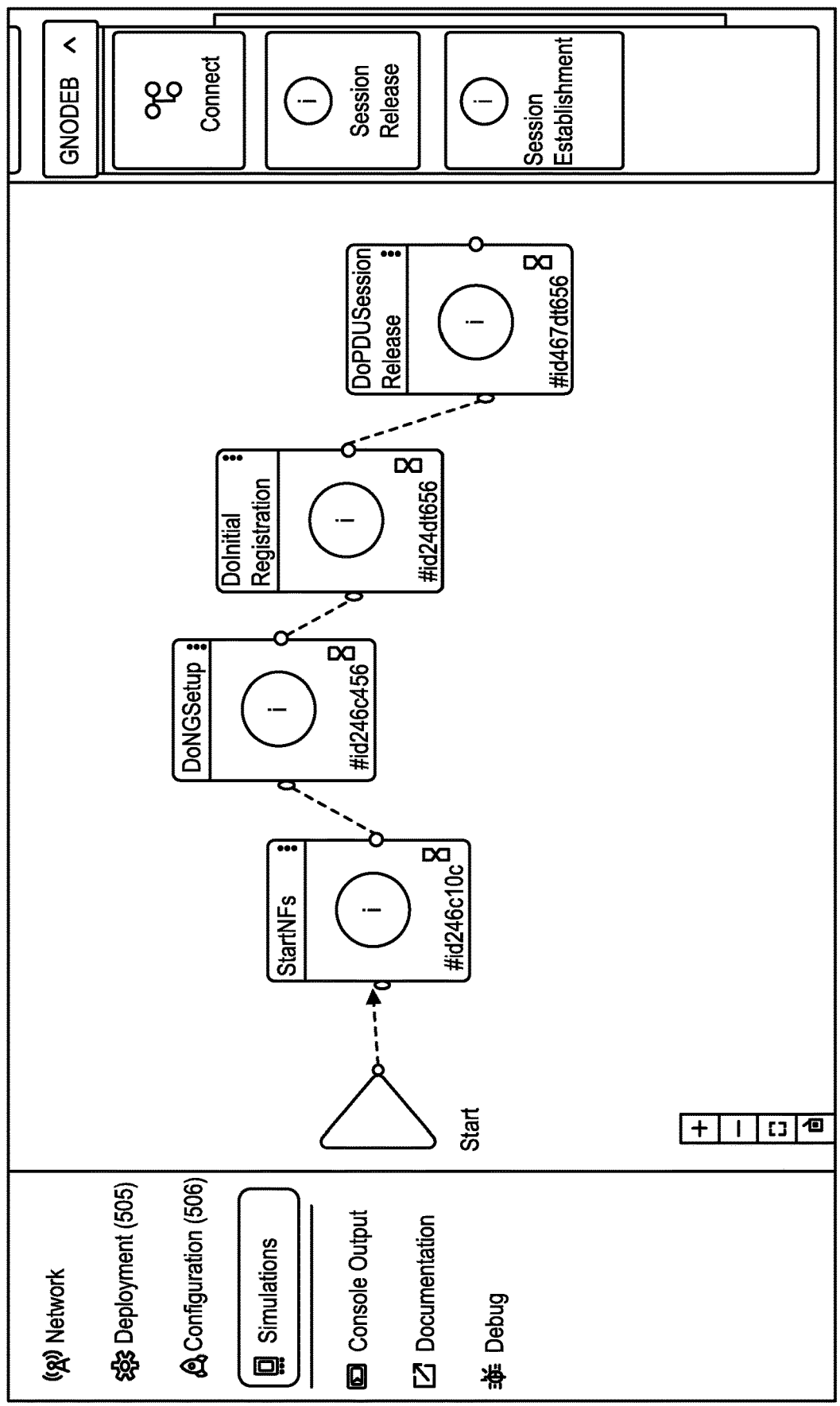
FIG. 12 is an example of a task flow diagram associated with the system, according to the embodiments disclosed herein.

FIG. 12 is an example of a task flow diagram associated with the system (100), according to the embodiments disclosed herein.

Referring to the FIG. 12, The task flow diagram is based on flow-based programming principles. Each of the nodes on the task flow diagram represent a call to one of the Procedure Service RPC of a particular simulator. A node on the task flow, provides the input UI form to configure the request data for a particular Procedure Service RPC. Along with the request data, the simulator target, on which the procedure service rpc will be called is also selected. During the execution, these request data along with the simulator target parameters is passed to the backend Task Engine which invokes the procedure on the corresponding simulator.

The task flow also supports branch for parallel execution, looping is also supported to support repeated flow execution and conditional execution based on procedure response data.

Figure 13:
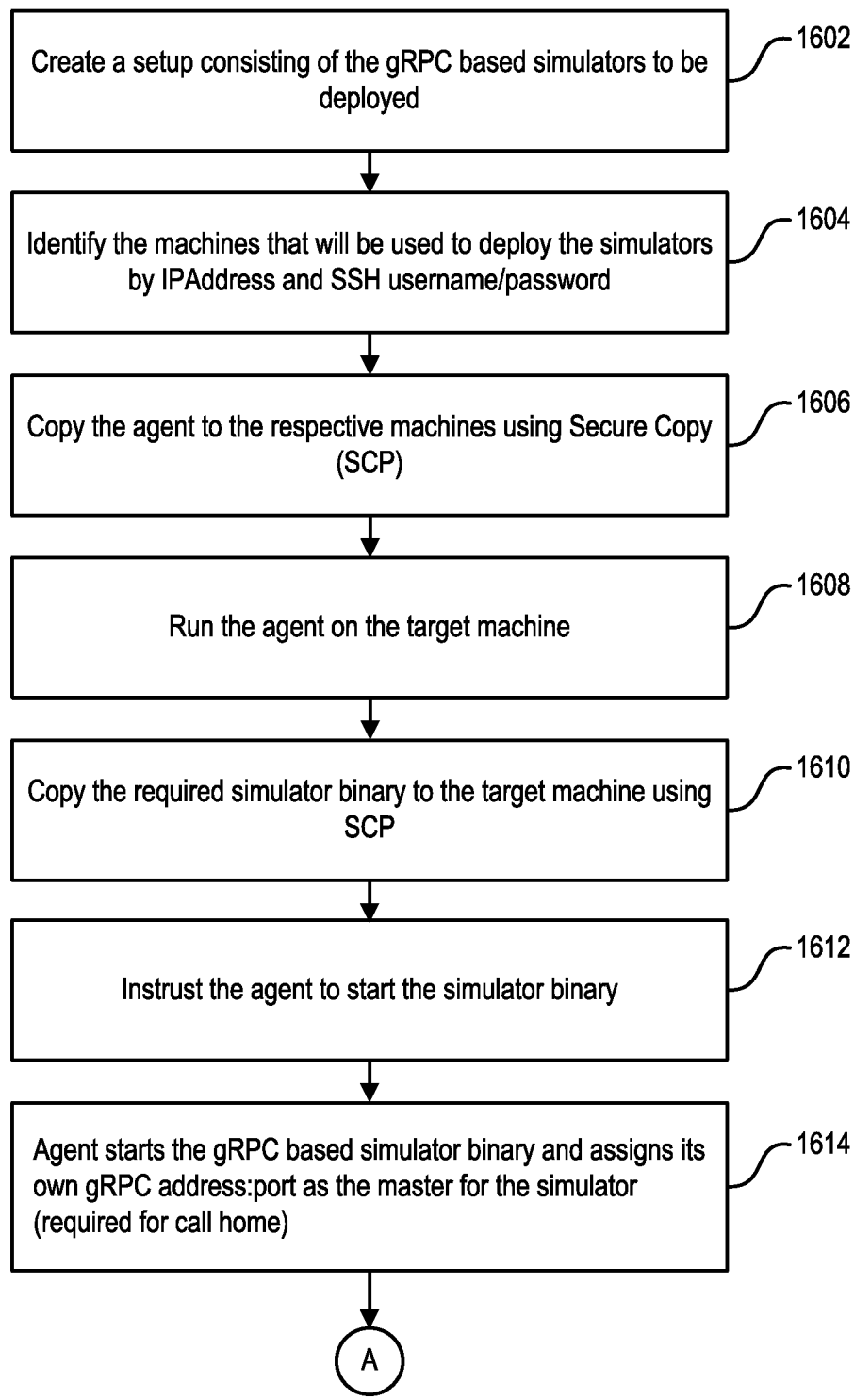
FIG. 13 is a flow chart illustrating deployment of the nodes in the system, according to the embodiments disclosed herein.
Figure 13:
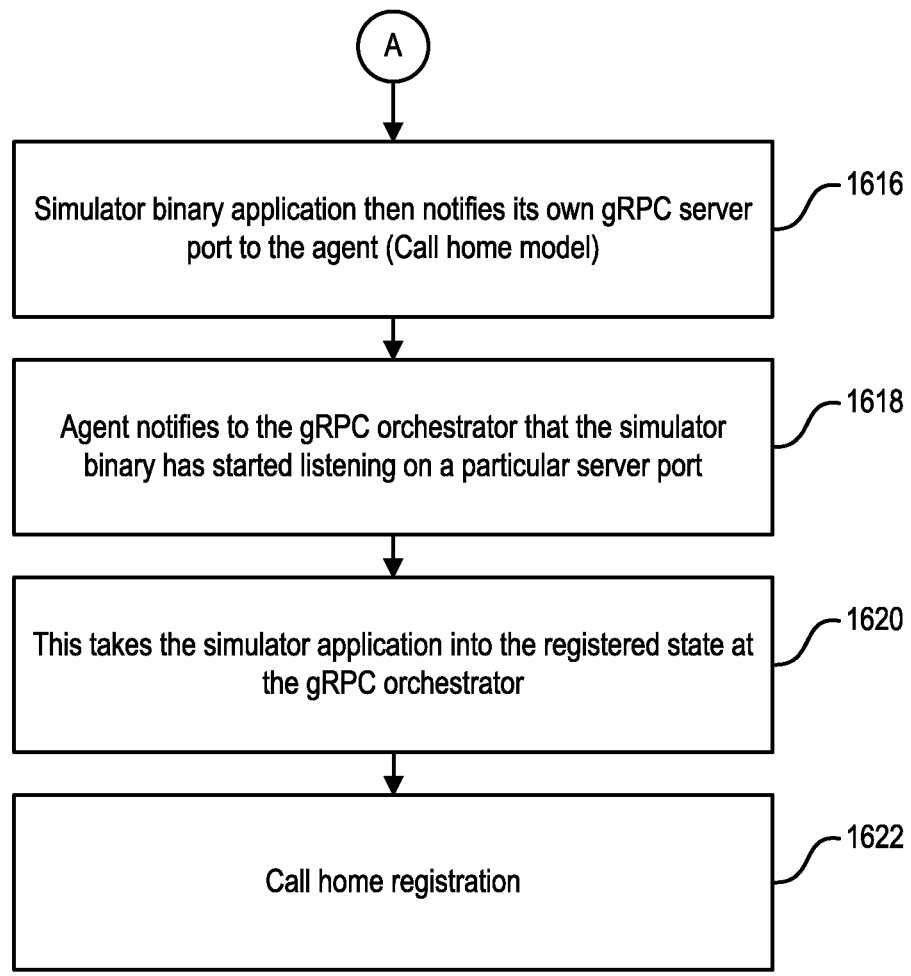

FIG. 13 is a flow chart illustrating the deployment of the nodes (104) in the system (100), according to the embodiments disclosed herein.

The deployment is done for a setup. The setup includes machines/VMs on which applications are deployed and the gRPC based applications that will be deployed on those machines. The deployment of the simulator applications requires the agent (104*a*). The agent (104*a*) works like a delegate of the orchestrator on the target VM or machine. The agent (104*a*) is also a gRPC based process. The features of the agent (104*a*) are:

1. Control the spawning of the simulator binary on the machine.
2. The agent (104*a*) runs with superuser privileges to be able to manage the network configurations of the machine.
3. The agent (104*a*) keeps track of the health of the processes that it has spawned.
4. The agent (104*a*) acts as the parent of the simulator applications and enables the call home registration of the application with the orchestrator.
5. The agent (104*a*) also notifies the orchestrator about the death of the simulator applications.

During the deployment phase, the setup consists of simulator applications that support the gRPC. The application uses the gRPC call to register the port with the agent (104*a*). The agent (104*a*) keeps track of the simulator applications. The call home model used by the simulation controller (103) to notify the agent (104*a*) allows the simulation controller (103) to notify the orchestrator in its own time when it can start receiving calls for procedures.

Referring to the FIG. 13, the method for deployment includes at step 1602, create the setup consisting of the gRPC based simulators to be deployed and at step 1604, identify the machines that will be used to deploy the simulators by IPAddress and SSH username/password. At step 1606, copy the agent (104*a*) to the respective machines using Secure Copy (SCP) and at step 1608, run the agent (104*a*) on the target machine. Further, at step 1610, copy the required simulator binary to the target machine using SCP and at step 1612, instruct the agent (104*a*) to start the simulator binary. Further, at step 1614, the agent (104*a*) starts the gRPC based simulator binary and assigns its own gRPC address:port as the master for the simulator (required for call home) and at step 1616, the simulator binary application notifies its own gRPC server port to the agent (104*a*) (Call home model). At step 1618, the agent (104*a*) notifies to the gRPC orchestrator that the simulator binary has started listening on a particular server port, at step 1620 takes the simulator application into the registered state at the gRPC orchestrator and at step 1622, the call home registration is completed.

The SIM controller (103) performs the health monitoring across two planes. The first is the system level health status and the second one is the application-level health status. For the system level health status, application resource usage and whether it is running or not is tracked by the agent. The agent also tracks the total machine resource usage. It reports all this information to the orchestrator. This enables the fine analysis of resource and any usage if application is hogging up the machine. All of this is presented in a graph-based view for easier visualization.

For health monitoring includes monitoring at least one of CPU usage total and CPU usage per application, memory usage total and Memory usage per application, input or output usage total and I/input or output usage per application and process state per application.

The health monitoring for the resource usage is done by the agent (104*a*) using OS dependent facilities like reading statistics from proc file systems. The application-level of health monitoring is done by the agent (104*a*) by directly interacting with the health service that is implemented by the simulator nodes (104). The simulator application then replies to a health query with a healthy or a not healthy response. The response is the application level health status. The healthy or not healthy response may be a simple ok or a value representing health: either of which is mentioned in the response object that is specified by the service.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system of orchestrating simulator application in a wireless network, wherein the system comprises:
    a memory to store information about a plurality of nodes available in the wireless network;
    a processor connected to the memory, configured to:
        displaying a simulator orchestration interface on a user device to orchestrating simulator application in the wireless network, wherein the simulator orchestration interface comprising a plurality of simulator applications;
        deploying at least one simulator application from the plurality of displayed simulator applications on at least one node of the plurality of nodes in the wireless network;

retrieving a proto file from the at least one node, wherein the proto file comprises service configuration parameters associated with the at least one node using a simulator specific communication channel;

configuring the at least one deployed simulator application on the at least one node based on the service configuration parameters mentioned in the retrieved proto file from the at least one node; and automatically controlling service procedures on the at least one node using the at least one configured simulator application using the simulator specific communication channel.

2. The system as claimed in claim 1, wherein configuring the at least one deployed simulator application on the at least one node based on the service configuration parameters mentioned in the retrieved proto file from the at least one node comprises:

dynamically generating and displaying a simulator configuration interface based on the service configuration parameters mentioned in the retrieved proto file from the at least one node, wherein the simulator configuration interface comprises a plurality of attributes corresponding to the service configuration parameters mentioned in the retrieved proto file from the at least one node;

receiving user input from the user device corresponding to the plurality of attributes corresponding to the service configuration parameters mentioned in the retrieved proto file from the at least one node; and configuring the at least one deployed simulator application on the at least one node based on the user input received in the plurality of attributes displayed in the simulator configuration interface.

3. The system as claimed in claim 1, wherein automatically controlling service procedures on the at least one node using the at least one configured simulator application comprises:

displaying a simulator flow control interface comprising the service procedures on the simulator orchestration interface, allocating the service procedures to be performed on the at least one node;

receiving performance statistics of the at least one node for the allocated service procedures; and displaying the performance statistics of the service procedures on the simulator orchestration interface; and storing the performance statistics of the service procedures in the memory.

4. The system as claimed in claim 1, wherein deploying the at least one simulator application from the plurality of displayed simulator applications on the at least one node comprises:

detecting the at least one simulator application selected by the user device;

creating and displaying at least one network diagram corresponding to the at least one selected simulator application in a workspace of the simulator orchestration interface;

establishing a connection with the at least one node to deploy the at least one selected simulator application;

receiving an input from the user device on the at least one network diagram to deploy the at least one selected simulator application;

automatically installing the at least one selected simulator application on the at least one node after establishing the connection; and displaying a deployed indication on the at least one network diagram corresponding to the at least one installed simulator application on the at least one node.

5. The system as claimed in claim 4, wherein establishing the connection with the at least one node to deploy the at least one selected simulator application comprises:

displaying a node configuration interface in the simulator orchestration interface;

receiving node credentials to login into the at least one node in the node configuration interface; and establishing the connection with the at least one node to deploy the at least one selected simulator application based on the node credentials.

6. The system as claimed in claim 5, wherein the connection with the at least one node is performed using an agent (104), wherein the agent (104) collects information about the available resources of the nodes and reports the information back to the orchestration interface.

7. A method of orchestrating simulator application in a wireless network, wherein the method comprises:

displaying a simulator orchestration interface on a user device to orchestrating simulator application in the wireless network, wherein the user interface comprising a plurality of simulator applications;

deploying at least one simulator application from the plurality of displayed simulator applications on at least one node of the plurality of nodes in the wireless network;

retrieving a proto file from the at least one node, wherein the proto file comprises service configuration parameters associated with the at least one node using a simulator specific communication channel;

configuring the at least one deployed simulator application on the at least one node based on the service configuration parameters mentioned in the retrieved proto file from the at least one node; and automatically controlling service procedures on the at least one node using the at least one configured simulator application using the simulator specific communication channel.

8. The method as claimed in claim 7, wherein configuring the at least one deployed simulator application on the at least one node based on the service configuration parameters mentioned in the retrieved proto file from the at least one node comprises:

dynamically generating and displaying a simulator configuration interface based on the service configuration parameters mentioned in the retrieved proto file from the at least one node, wherein the simulator configuration interface comprises a plurality of attributes corresponding to the service configuration parameters mentioned in the retrieved proto file from the at least one node;

receiving user input from the user device corresponding to the plurality of attributes corresponding to the service configuration parameters mentioned in the retrieved proto file from the at least one node; and configuring the at least one deployed simulator application on the at least one node based on the user input received in the plurality of attributes displayed in the simulator configuration interface.

9. The method as claimed in claim 7, wherein automatically controlling service procedures on the at least one node using the at least one configured simulator application comprises:

displaying a simulator flow control interface comprising the service procedures on the simulator orchestration interface, allocating the service procedures to be performed on the at least one node;

receiving performance statistics of the at least one node for the allocated service procedures; and displaying the performance statistics of the service procedures on the simulator orchestration interface; and storing the performance statistics of the service procedures in the memory.

10. The method as claimed in claim 7, wherein deploying the at least one simulator application from the plurality of displayed simulator applications on the at least one node comprises:

detecting the at least one simulator application selected by the user device;

creating and displaying at least one network diagram corresponding to the at least one selected simulator application in a workspace of the simulator orchestration interface;

establishing a connection with the at least one node to deploy the at least one selected simulator application;

receiving an input from the user device on the at least one network diagram to deploy the at least one selected simulator application;

automatically installing the at least one selected simulator application on the at least one node after establishing the connection; and displaying an deployed indication on the at least one network diagram corresponding to the at least one installed simulator application on the at least one node.

11. The method as claimed in claim 10, wherein establishing the connection with the at least one node to deploy the at least one selected simulator application comprises:

displaying a node configuration interface in the simulator orchestration interface;

receiving node credentials to login into the at least one node in the node configuration interface; and establishing the connection with the at least one node to deploy the at least one selected simulator application based on the node credentials.

12. The method as claimed in claim 11, wherein the connection with the at least one node is performed using an agent (104), wherein the agent (104) collects information about the available resources of the nodes and reports the information back to the orchestration interface of the user device.

* * * * *